United States Patent [19]

Gidaspow et al.

[11] 4,224,135
[45] Sep. 23, 1980

[54] CROSS-FLOW ELECTROFILTER AND METHOD

[75] Inventors: Dimitri Gidaspow, Northbrook; Chang H. Lee, Chicago; Darsh T. Wasan, Westmont, all of Ill.

[73] Assignee: The United States of America as represented by the United States Department of Energy, Washington, D.C.

[21] Appl. No.: 956,709

[22] Filed: Nov. 1, 1978

[51] Int. Cl.² ............................................. C10G 33/02
[52] U.S. Cl. .................................................... 204/302
[58] Field of Search .............................. 204/302, 272

[56] References Cited

U.S. PATENT DOCUMENTS

| | | | |
|---|---|---|---|
| 2,640,026 | 5/1953 | Whittington | 204/302 |
| 2,925,372 | 2/1960 | Keehn | 204/302 |
| 3,891,528 | 6/1975 | Griswold | 204/302 |
| 4,066,526 | 1/1978 | Yeh | 204/302 |

Primary Examiner—T. M. Tufariello
Attorney, Agent, or Firm—James E. Denny; Frank H. Jackson; Hugh W. Glenn

[57] ABSTRACT

A filter for clarifying carbonaceous liquids containing finely divided solid particles of, for instance, unreacted coal, ash and other solids discharged from a coal liquefaction process is presented. The filter includes two passageways separated by a porous filter medium. In one preferred embodiment the filter medium is of tubular shape to form the first passageway and is enclosed within an outer housing to form the second passageway within the annulus. An electrode disposed in the first passageway, for instance along the tube axis, is connected to a source of high voltage for establishing an electric field between the electrode and the filter medium. Slurry feed flows through the first passageway tangentially to the surfaces of the filter medium and the electrode. Particles from the feed slurry are attracted to the electrode within the first passageway to prevent plugging of the porous filter medium while carbonaceous liquid filters into the second passageway for withdrawal. Concentrated slurry is discharged from the first passageway at an end opposite to the feed slurry inlet. Means are also provided for the addition of diluent and a surfactant into the slurry to control relative permittivity and the electrophoretic mobility of the particles.

6 Claims, 4 Drawing Figures

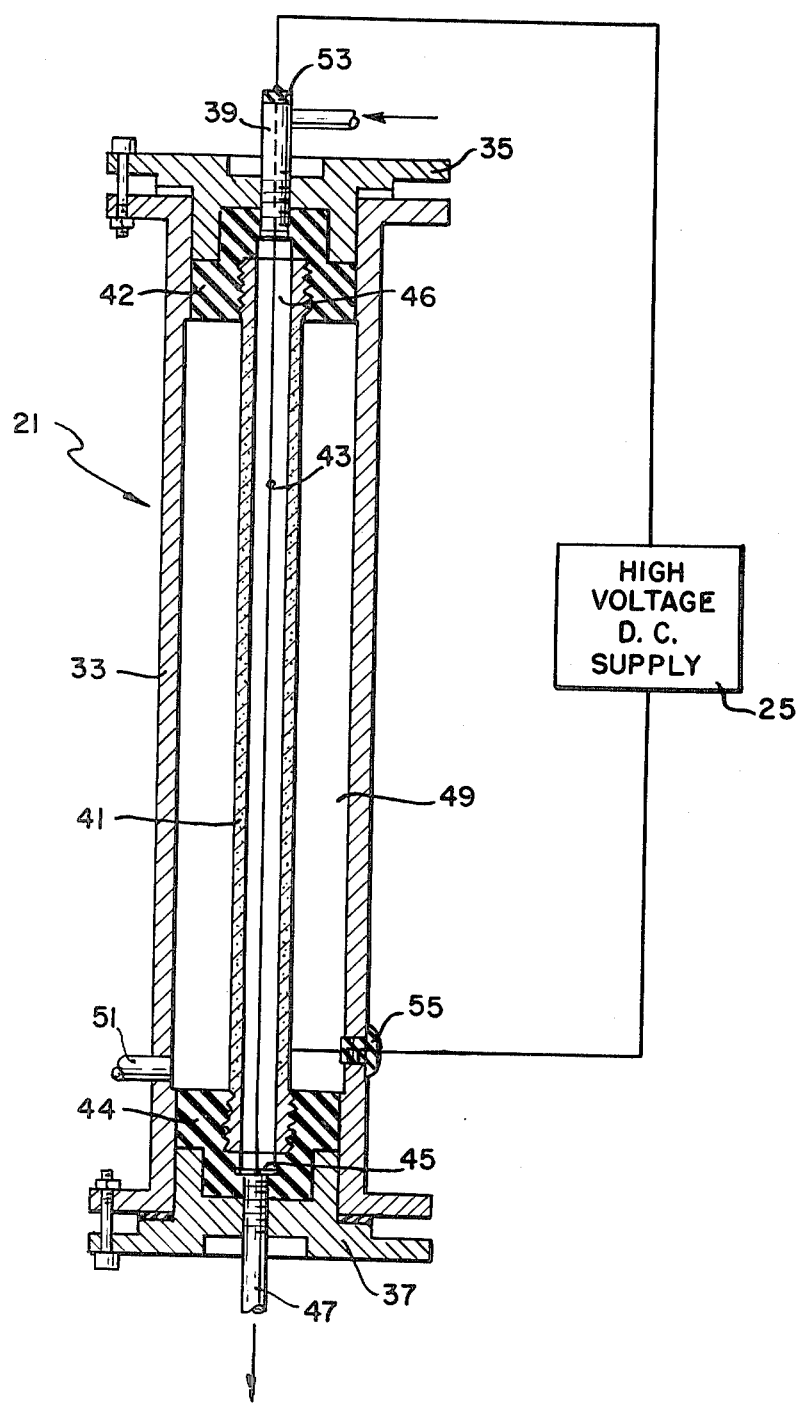

CROSS-FLOW ELECTROFILTER AND METHOD

CONTRACTUAL ORIGIN OF THE INVENTION

The invention described herein was made in the course of or under, a contract with the United States Department of Energy and the National Science Foundation.

BACKGROUND OF THE INVENTION

The present invention relates to filtering devices that can be employed in clarifying nonaqueous carbonaceous liquids containing fine particles within slurries. It is particularly well adapted for use in clarifying carbonaceous liquid fuels such as those produced in the liquefaction of coal and other solid carbonaceous material.

One major problem in the development of coal liquefaction processes is the removal of fine solid particles following liquefaction. Rotary drum filtration has been employed, but its unfavorable economics have stimulated research into alternate techniques.

The settling of solids by the addition of a precipitating liquid, such as O-xylene, has been attempted but large volumes of promoter liquids are necessary. In addition, settling separations have not worked well for the final removal of fine particles or particles in colloidal dispersions.

In related prior processes, aqueous suspensions of fine particles have been subjected to forced-flow electrophoresis at low voltages to prevent the decomposition of water. Electrostatic precipitation of dust from air has been carried out at high electrical potentials, but these procedures are different and have not previously been applied to clarify liquids from slurries.

PRIOR ART STATEMENT

U.S. Pat. No. 3,856,675 to Sze et al., "Coal Liquefaction". This patent shows the use of a promoter liquid added to a coal liquefaction product to enhance the gravity settling of insoluble material. A promoter such as O-xylene that can be subsequently removed by fractionation is employed. The disclosure points out at column 1, lines 19-23, that previous filtration techniques have not been successful as a result of plugging of filter pores.

Moulik, "Physical Aspects of Electrofiltration", *Environmental Science and Technology,* Vol. 5, September 1971, 771-775. At page 772, column 1, this articles discusses the use of electrofiltration to prevent the plugging of filter pores during the filtration of aqueous solutions. Low voltages are employed to avoid heating effects and the electrolysis of water.

Henry, "Cross-Flow Filtration", *Recent Developments in Separation Science,* Vol. 2, pages 205-224, 1972. This article discusses the use of flow tangential to the filter medium to minimize the accumulation of particles on the filter surface. The discussion does not extend to the use of electrodes for electrophoretic separation of suspensions within slurries.

Henry et al., "A Solid/Liquid Separation Process Based on Cross-Flow and Electrofiltration", *AICHE Journal,* Vol. 23, No. 6, November 1977, pages 851-859. The article discusses a mathematical model and experimental data for the electrofiltration of suspensions of kaolin clay or oil emulsions from an aqueous solution. The processing of carbonaceous liquids requiring extremely high voltages is not contemplated.

SUMMARY OF THE INVENTION

In view of the problems associated with prior systems, it is therefore an object of the present invention to provide an electrofilter for clarifying carbonaceous liquids containing fine particles.

It is also an object to provide such a filter to remove solid particles suspended within the product of coal liquefaction processes with minimal plugging of the filter openings.

It is a further object to provide a method of clarifying carbonaceous liquids containing finely dispersed solids through use of both electrophoretic and cross-flow filtration principles.

It is a further object to provide a method of clarifying liquid produced in the liquefaction of coal in which the electrophoretic mobility of particles and the relative permittivity of the liquid are controlled.

In accordance with the present invention, an electrofilter apparatus is provided having an elongated housing with two passageways separated by a lengthwise porous filter medium. The first passageway includes an inlet for the flow of carbonaceous liquid containing solid particles and an outlet for a concentrate of the solid particles in a residual portion of the liquid. A second passageway receives and discharges clarified carbonaceous liquid through the porous filter medium. An electrode extends lengthwise along the first passageway spaced from the porous filter medium and is connected to a source of electrical potential having the capability of providing an electric field with at least 1000 volts/cm between the electrode and the filter medium. The source of electrical potential includes implementation to reverse the electric field such that suspended particles can be attracted to the electrode in ordinary operation, or repelled from the electrode during the periodic cleaning operations.

In more specific aspects of the development, a tubular porous filter medium is provided to define the first passageway with an outer annulus within the filter housing as the second passageway for receiving filtrate. An interconnecting vessel is positioned below the first passageway containing the electrode such that on reversal of the electric field agglomerated solids are trapped in the vessel for settling.

The invention also contemplates a method of electrofiltering carbonaceous liquids from suspensions or slurries. The slurry is passed generally parallel along the surface of a porous filter medium and along the electrode for establishing an electrical field between the medium and the electrode. The electric field urges solid particles, even those in colloidal suspension, away from the porous filter surface and towards the electrode to establish a layer of clear liquid adjacent to the filter surface. A portion of the carbonaceous liquid filters through the filter medium, leaving a slurry concentrated in solid particles.

In other specific aspects, the relative permittivity of the slurry and the electrophoretic mobility of the particles are controlled by the addition of diluent liquids and of surfactants.

BRIEF DESCRIPTION OF THE DRAWINGS

The present invention is illustrated in the accompanying drawings wherein:

FIG. 2 is a cross-sectional view of an electrofiltration apparatus with some components schematically shown.

DETAILED DESCRIPTION OF THE PREFERRED EMBODIMENT

Figure 1:
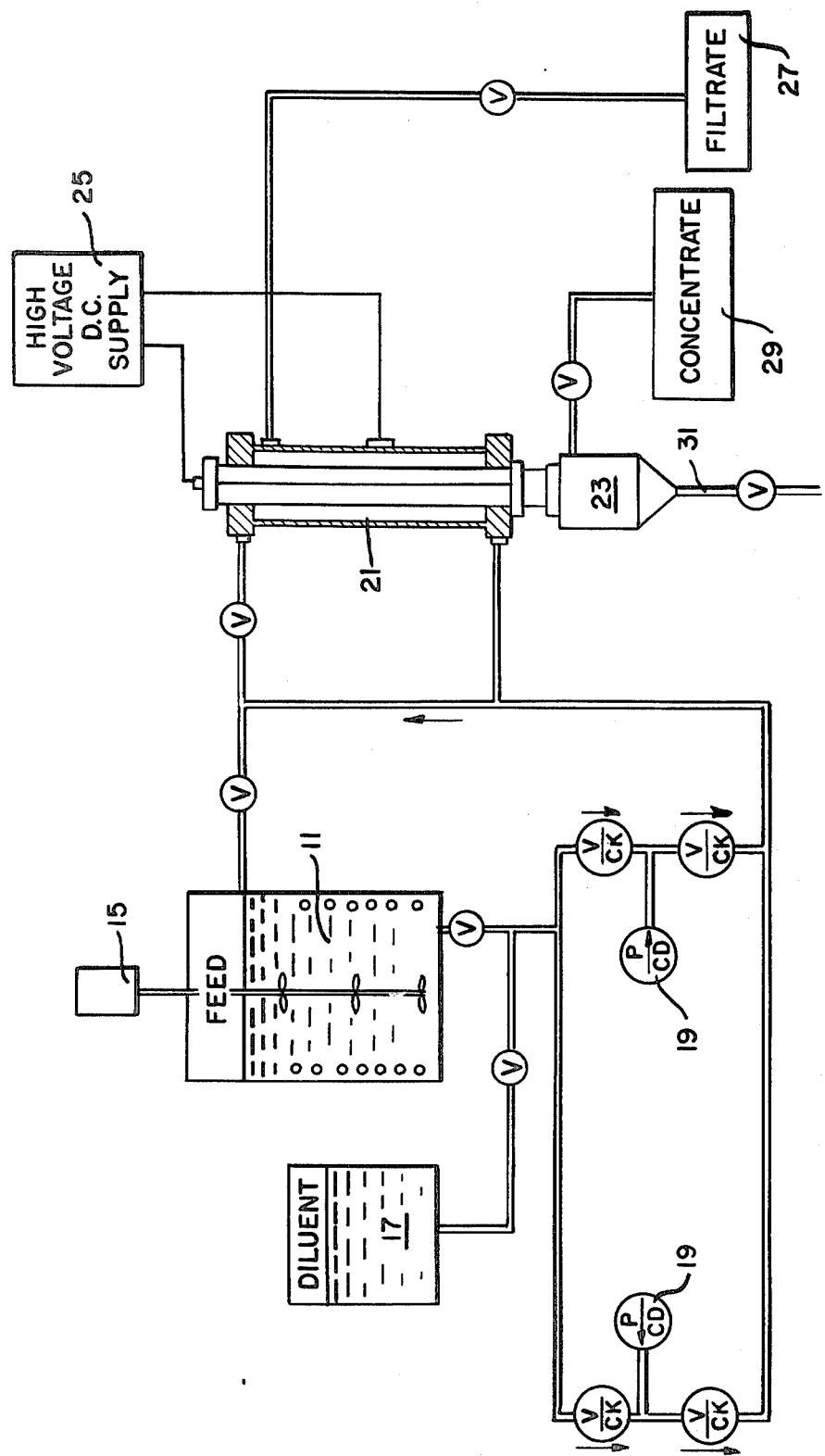
FIG. 1 is a schematic flow diagram showing a process for the electrofiltration of carbonaceous liquid.

FIG. 1 schematically illustrates a process for the electrofiltration of carbonaceous liquids. Liquids such as those produced in the liquefaction of coal or other solid carbonaceous materials are contemplated. For example, solid materials such as bituminous coal, lignite coal, wood, lignin, oil shale, tar sand, peat and solid petroleum residuals may be subjected to liquefaction processes that result in slurries containing solid particles of unreacted materials and ash. The particles may be relativley large and dense such that a preliminary settling operation can be beneficial. Other particles may be very small and finely dispersed, possibly in colloidal suspension. It is to this latter condition of finely dispersed particles that the subject invention has particular application. For example, slurries containing particles of less than 1 micrometer up to 15 micrometers can be processed with the electrofilter described herein.

In order to present the present invention in as uncomplicated a manner as possible, various control valves, gages and bypass lines have been omitted from the FIG. 1 diagram. It will be understood to one skilled in the art that suitable pressure and flow-regulating valves as well as pressure, temperature and flow gages can be included in a manner known in the art. Suitable sources of compressed air can also be provided into the electrofilter for back-blowing and cleaning the filter medium of lodged solids.

The process of FIG. 1 includes a feed tank 11 containing a slurry of carbonaceous liquid and solids. A preliminary settling operation (not shown) can be used to remove gross particles and reduce the slurry concentration before the feed enters tank 11. Feed tank 11 is equipped with an agitator 15 to provide a uniform slurry consistency.

A second feed tank 17 containing a diluent liquid is connected in parallel with the feed slurry so that sufficient diluent can be added into the feed flow to maintain the relative permittivity (dielectric constant) and electrical conductivity at a suitably low level to prevent excessive decomposition and resistance heating of the slurry within the electrofilter. Relative permittivities in the range of 1–4 are preferred to permit use of high-voltage electric fields. Hydrocarbon liquids such as tetraline, xylene and distillates of the coal liquefaction process have low dielectric constants and electrical conductivity so as to be suitable for use as the diluent liquid.

Surfactants such as Aerosol OT (dioctyl sodium sulfosuccinate) also can be added through tank 17 to adjust the electrophoretic mobility of particles to a suitable level, e.g. to about 0.01 to 0.1 micrometer/sec per volt/cm. Sufficient electrophoretic mobility is needed to permit the formation of a clear layer of carbonaceous liquid adjacent to the filter medium at a practical electric field strength.

Two constant delivery pumps 19 are shown connected in parallel with suitable check valves on their inlet and discharge to permit reciprocal operation. For instance, two piston pumps operating 180 degrees out of phase from a common drive are suitable in this application. Flow to the electrofilter 21 is controlled through use of appropriate valves and a recycle flow into feed tank 11. It will be clear that various other known pumps and flow control schemes capable of handling slurry flow can be used in this process.

Electrofilter 21 can be provided with a receiver 23 for agglomerated solids that are periodically purged from the filter. The solids are attracted towards a central electrode maintained at a high potential in respect to the filter medium by a high-voltage DC supply 25. This forms a clear boundary layer of carbonaceous liquid and prevents plugging of the filter medium pores. As shown, the filtered carbonaceous liquid is removed from the electrofilter and collected in an appropriate container 27 for further processing. The remaining concentrated slurry is collected from the top of receiver 23 into container 29. Agglomerated solids that have further settled in vessel 23 can be removed periodically at outlet 31. Continuous solids removal can be achieved using a screw or other conveyor mechanism (not shown) capable of transferring wet solids across a pressure difference.

The filtered liquid can be further processed by distillation to provide various fractions of naphtha and fuel oil. An appropriate fraction having suitably low relative permittivity can be recycled as diluent liquid.

In FIG. 2, a more detailed cross section of the electrofilter is shown. Electrofilter 21 includes an outer housing 33 with end closures 35 and 37. End closure 35 is provided with an inlet nozzle 39 for the slurry feed. Nozzle 39 communicates with a centrally supported porous tube 41 which serves as the filter medium. As shown, an outlet nozzle 47 penetrates end closure 37 into flow communication with the porous filter tube and a filtrate discharge nozzle is shown at 51 through the housing 33 wall communicating with the annulus 49 between the filter tube 41 and the housing 33. Tube 41 is shown supported within electrically insulative bushings 42 and 44 fitted into housing 33 at opposing ends. Although porous tube 41 is illustrated in this preferred embodiment as being concentric with housing 33, it will be clear that other configurations such as parallel flow channels separated by porous filter media and reversal of the slurry and filter passageways also can be employed.

Porous tube 41 can be of any suitable filter material having pore openings somewhat larger than the finest of the particles to be removed from colloidal suspensions, for instance, about 3 to 15 micrometers openings for the filtration of slurries produced in the liquefaction of coal. Electrically conductive materials such as porous stainless steel or porous carbon are examples of those that can be employed.

An elongated electrode 43 is illustrated as concentrically supported within and along the length of porous filter tube 41. The electrode is electrically insulated from the filter tube and other electrofilter components at points of support such as at spider support member 45. Other suitable means of insulatively supporting the electrode parallel to the filter surface will be apparent to those skilled in the art.

The electrode can be provided of corrosion-resistant materials such as platinum. In applications with positive charged particles, the electrode is maintained at a negative potential relative to the filter tube and electrolytic dissolution of the electrode metal is minimized. In such cases electrically conductive, base metal alloys including such as iron or copper may be suitable for use in the electrode.

The high-voltage DC supply 25 is connected between the central electrode 43 and the porous filter tube 41 as indicated with suitable electrical insulation as shown at points of entry through the inlet nozzle and housing at 53 and 55.

Porous filter tube 41 provides a first passageway into which the slurry feed enters at nozzle 39 and concentrated slurry is discharged at nozzle 47 into receiver 23. The filtered carbonaceous liquid passes through the pore openings of filter tube 41 into a second passageway defined in the annular volume 49 between housing 33 and the porous filter tube 41. The filtrate passing through the filter tube is discharged from the annular volume 49 at outlet 51.

The portion of porous tube 41 fitted within bushing 42 at the slurry entrance provides a zone 46 for the development of a boundary of clear carbonaceous liquid. The electric field established between electrode 43 and tube 41 within this zone 46 urges particles towards the electrode away from the filter tube walls before the slurry is exposed to the remainder of the filter medium. The clear carbonaceous liquid layer remaining adjacent to the porous filter medium surfaces may then filter through the porous tube walls into annular passageway 49 free of particles. Feed rates are adjusted to maintain laminar flow and the clear layer of carbonaceous liquid within the porous filter tube.

During operation, a high-voltage difference is imposed by supply 25 between electrode 43 and porous filter tube 41. Electric fields in excess of 1000 volts/cm spacing are contemplated. The inventors have found that increases in electric field much beyond a certain level depending on properties, particularly the electrophoretic mobility, of the slurry particles provide only a diminishing return in increased filtration rate. For the particular systems examined, electric fields of up to about 7000 volts/cm have provided some increase in filtration rates but in diminished amounts at the higher electric field strengths. It is therefore expected that fields of about 1000 to 10,000 volts/cm will have value in the electrofiltration of the various carbonaceous liquids produced in coal liquefaction. Thus DC voltage supply 25 is provided with typically 1000-25000 volts range depending on the spacing between the central electrode 43 and the filter medium 41.

The following example is presented to illustrate the present invention.

EXAMPLE

An electrofilter substantially as illustrated in FIGS. 1 and 2 was employed to clarify carbonaceous liquid from samples of bituminous coal liquefied in the H coal process obtained from the Process Development Unit operated by Hydrocarbon Research Inc. in Trenton, N.J. The liquefaction product was diluted with xylene (40%) and tetralin (5.5%) to form a mixture of reduced relative permittivity with a coal liquid to diluent ratio of about 1.2 by weight. The mixture contained about 1.25 weight percent solid particles of about 0.3 to about 5 micrometers in size. Sufficient surfactant, Aerosol OT (dioctyl sodium sulfosuccinate) was added to the mixture to provide an electrophoretic mobility of the particles of about 0.02 micrometers/second per volt/centimeter.

The electrofilter was operated at feed rates of about 1–5 cm$^3$/sec, pressure differences of about 10–70 psi and electric fields of about 1–7 kv/cm with a little more than 1 cm spacing between the electrode and the porous filter tube. About 0.5 to 3 cm$^3$/sec filtrate was obtained. After about an hour's operation at the low flow rates it was necessary to reverse the electric polarity to break up the accumulation of particles around the center electrode. Longer runs of several hours were possible with the higher flow rates.

Figure 4:
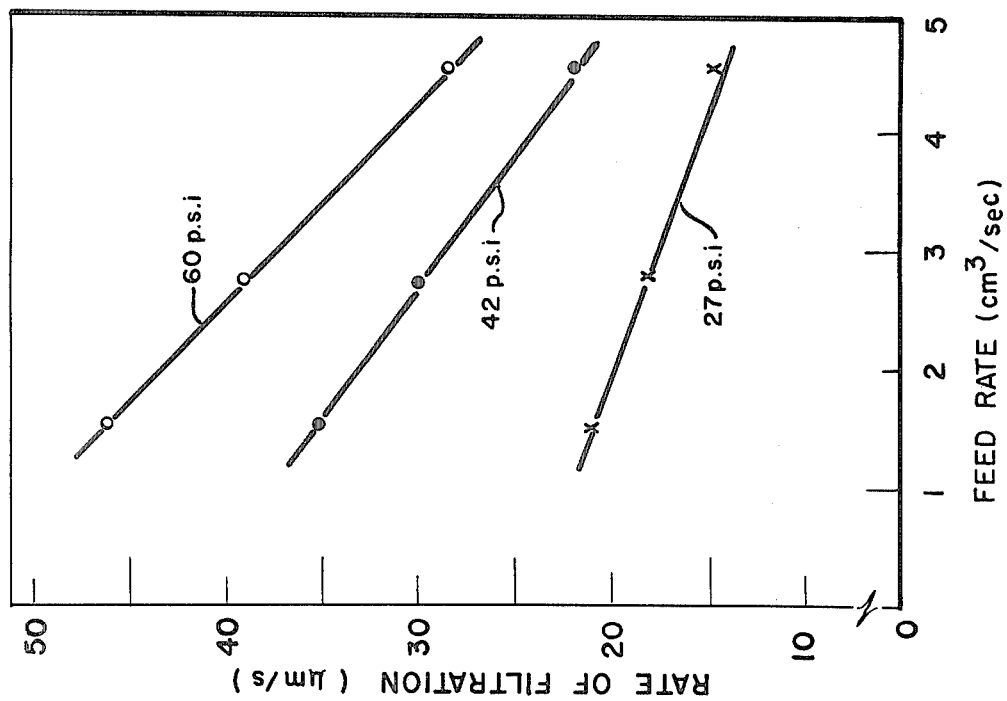
FIG. 4 is graph showing the effect of feed rate on filtration velocity with pressure difference as a parameter.
Figure 3:
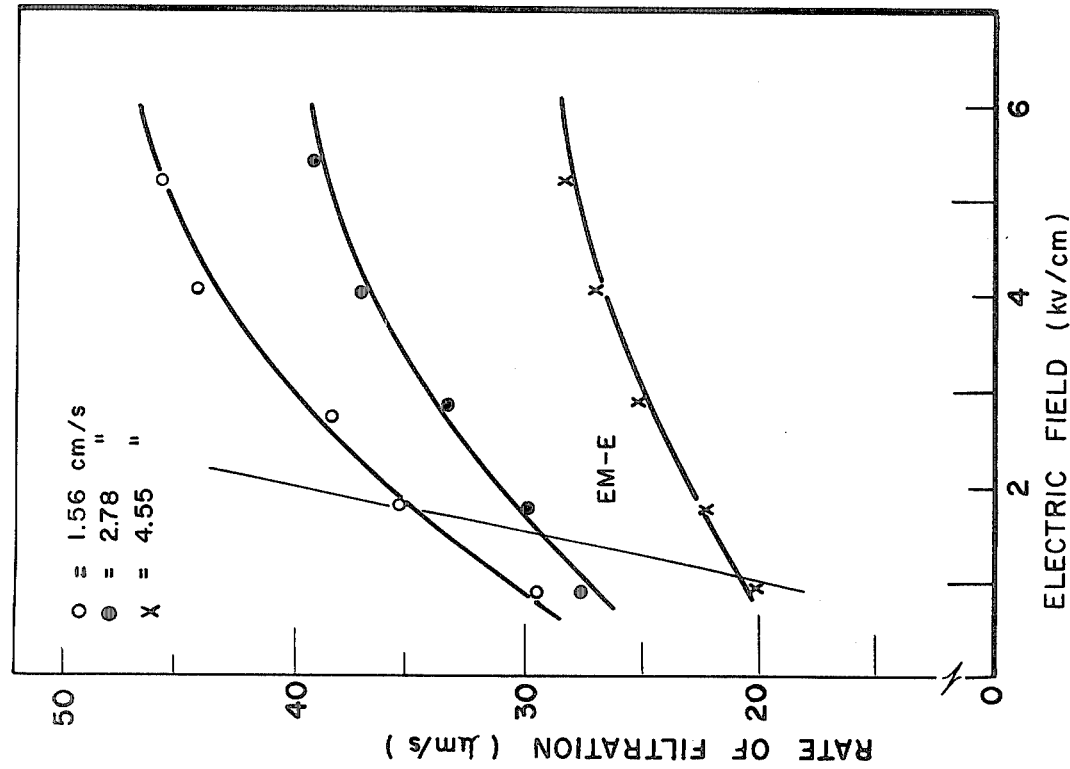
FIG. 3 is a graph showing the effect of electric field strength on filtration velocity with feed rate as a parameter.

The results are illustrated in FIG. 3, showing the filtration velocity as a function of electric field with feed rate as a parameter and in FIG. 4 showing filtration velocity as a function of feed rate with pressure differences as a parameter. FIG. 3 also shows the independently measured electrophoretic velocity of particles, that is electrophoretic mobility x electric field (EM·E), at which the filtration curve theoretically should be flat. The deviation from the theoretical line may be due to the cake formation around the central electrode.

It will therefore be seen that the present invention provides a suitable system for the electrofiltration of coal liquids or other carbonaceous liquids for the removal of finely dispersed particles. The method also permits the adjustment of the relative permittivity in the liquid to prevent its decomposition and the adjustment of the electrophoretic mobility of particles to permit the electrical separation. By using a cross-flow filtration technique in combination with the electrophoretic migration of particles, the porous filter medium is kept clear of a filter cake to prevent plugging of pores. Solids building up on the high-voltage electrode can be removed by polarity reversal for short periods with the expulsion of agglomerated particles.

The electrofilter is of compact configuration providing parallel concentric passageways for the flow of slurry and of filtrate. The tubular filter medium permits a single electrode to be equally spaced from the filter surfaces.

It will be clear that the invention is defined in terms of specific embodiments and that various changes in methods, materials and structure can be made by those skilled in the art within the scope of the invention defined in the following claims.

The embodiments of the invention in which an exclusive property or priviledge is claimed are defined as follows:

1. A cross-flow electrofilter for removing solid particles from a slurry of carbonaceous liquid comprising:
   an elongated housing;
   an electrically conductive filter tube having porous walls concentrically disposed within said housing to form first and second passageways respectively within said tube and within the annulus between said tube and housing, said filter tube having an inlet and an outlet at opposite end portions thereof for admitting slurry feed and discharging slurry concentrated in solid particles, said housing having an outlet for discharging carbonaceous liquid filtrate that passes through the porous walls of said filter tube;
   an elongated electrode extending along the lengthwise axis within said filter tube from its inlet to its outlet;
   electrical means connected to said electrode and said filter tube for establishing an electrical field of 1000–10,000 volts/cm between said tube wall and electrode to attract particles to said electrode and for reversing electrical polarity to release solid particles from said electrode; and an electrically insulating bushing engaging said filter tube at its inlet end portion to occlude the porous tube wall along a portion of its length and thereby establish a zone within the occluded wall portion subjected to said electric field for establishing a circumferential boundary of clear carbonaceous liquid adjacent to the filter tube wall.

2. The cross-flow electrofilter of claim 1 wherein pumping means are provided for passing a laminar flow of carbonaceous liquid slurry through said filter tube.

3. The electrofilter of claim 1 wherein there is included a vessel connected to the outlet of said first passageway for receiving particles.

4. The electrofilter of claim 1 wherein said porous filter tube has pore openings larger than the average size of particles in said carbonaceous liquid.

5. The electrofilter of claim 1 wherein said pore openings are about 2 to 15 $\mu$m diameter.

6. The electrofilter of claim 1 wherein there is included means for introducing a diluent solvent and a surfactant to lower the dielectric constant and increase the electrophoretic mobility of the carbonaceous liquid entering said first passageway.

* * * * *